US012619396B2

(12) United States Patent
Lin

(10) Patent No.: US 12,619,396 B2
(45) Date of Patent: May 5, 2026

(54) RANDOM-NUMBER-GENERATING CIRCUIT

(71) Applicant: Winbond Electronics Corp., Taichung City (TW)

(72) Inventor: Chih-Feng Lin, Hsinchu City (TW)

(73) Assignee: WINBOND ELECTRONICS CORP., Taichung City (TW)

( * ) Notice: Subject to any disclaimer, the term of this patent is extended or adjusted under 35 U.S.C. 154(b) by 954 days.

(21) Appl. No.: 17/872,645

(22) Filed: Jul. 25, 2022

(65) Prior Publication Data

US 2024/0028300 A1    Jan. 25, 2024

(51) Int. Cl.
*G06F 7/58* (2006.01)

(52) U.S. Cl.
CPC .................................... *G06F 7/588* (2013.01)

(58) Field of Classification Search
CPC .................................... G06F 7/58; G06F 7/588
See application file for complete search history.

(56) References Cited

U.S. PATENT DOCUMENTS

| | | | | |
|---|---|---|---|---|
| 4,855,690 | A | * | 8/1989 | Dias .......................... H03K 3/84 708/251 |
| 7,526,087 | B2 | | 4/2009 | Sun |
| 7,904,494 | B2 | | 3/2011 | Cho et al. |
| 9,141,338 | B2 | | 9/2015 | Idgunji et al. |
| 10,992,291 | B2 | | 4/2021 | Wang et al. |
| 11,023,207 | B1 | | 6/2021 | Do |
| 2014/0351305 | A1 | * | 11/2014 | Hamilton ................ G06F 7/588 708/250 |
| 2020/0228104 | A1 | * | 7/2020 | Wang ..................... H03K 19/21 |

FOREIGN PATENT DOCUMENTS

| | | |
|---|---|---|
| CN | 111490757 A | 8/2020 |
| TW | 200925982 A | 6/2009 |

OTHER PUBLICATIONS

Flip Flops: Understanding D Flip Flop Logic & Timing, Digilent Reference, 2021 found at https://digilent.com/reference/learn/fundamentals/digital-logic/flip-flops/start?srsltid=AfmBOooDh8rcUNib9bU5xHBS-S-PusAiGK45K-tGyH6K4XQfEYm9e821 (Year: 2021).*

* cited by examiner

*Primary Examiner* — Emily E Larocque
(74) *Attorney, Agent, or Firm* — Birch, Stewart, Kolasch & Birch, LLP

(57) ABSTRACT

A random-number-generating circuit is provided, which includes a noise-voltage generator, a voltage-controlled oscillator, a ring oscillator, and a D flip-flop (DFF). The noise-voltage generator converts an external voltage into a noise voltage. The voltage-controlled oscillator receives the noise voltage, and generates a first clock signal according to the noise voltage. The ring oscillator generates a sampling clock signal. The DFF receives the first clock signal, and samples the first clock signal using the sampling clock signal to obtain an output digital signal, wherein the output digital signal represents a random number.

15 Claims, 5 Drawing Sheets voltage voltage voltage

RANDOM-NUMBER-GENERATING CIRCUIT

BACKGROUND OF THE INVENTION

Field of the Invention

The present invention relates to electronic circuits, and, in particular, to a random-number-generating circuit.

Description of the Related Art

Random number generators (RNGs) play an important role in many different applications, such as cryptographic applications, statistical computing, the row-hammer mechanism in dynamic random access memories (DRAMs), and more. However, conventional random number generators have related circuits, such as linear feedback displacement registers and ring-oscillator-based random-number generators. As a result, the numbers that are generated are often not real random numbers, but are certain deterministic/periodic pseudo-random numbers.

BRIEF SUMMARY OF THE INVENTION

In view of the above, a random-number-generating circuit is provided in the present invention to solve the aforementioned problem.

An embodiment of the present invention provides a random-number-generating circuit is provided, which includes a noise-voltage generator, a voltage-controlled oscillator, a ring oscillator, and a D flip-flop (DFF). The noise-voltage generator converts an external voltage into a noise voltage. The voltage-controlled oscillator receives the noise voltage, and generates a first clock signal according to the noise voltage. The ring oscillator generates a sampling clock signal. The DFF receives the first clock signal, and samples the first clock signal using the sampling clock signal to obtain an output digital signal, wherein the output digital signal represents a random number.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
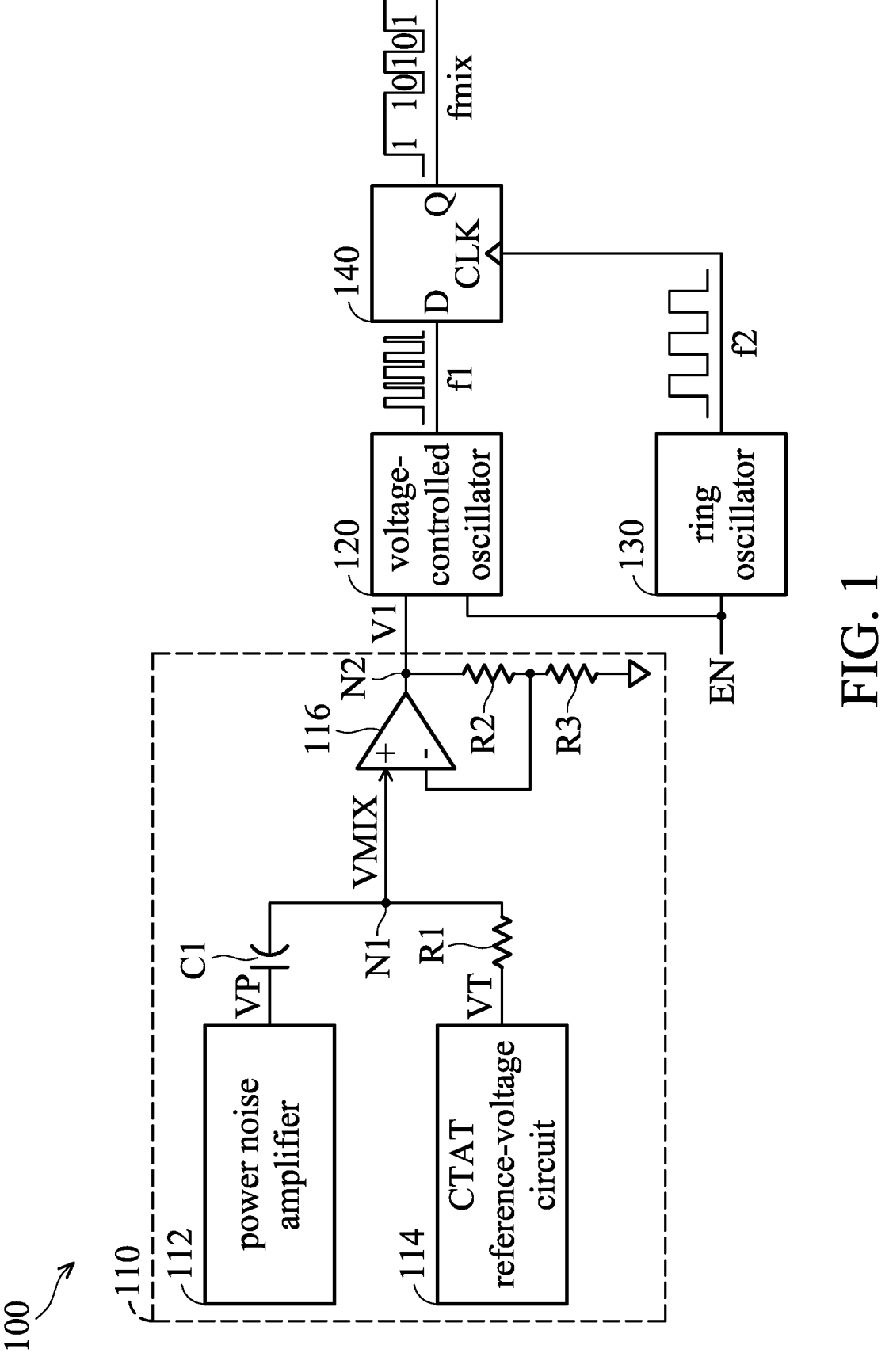
FIG. 1 is a block diagram of a random-number-generating circuit in accordance with an embodiment of the invention.

FIG. 1 is a block diagram of a random-number-generating circuit in accordance with an embodiment of the invention.

As shown in FIG. 1, the random-number-generating circuit 100 may include a noise-voltage generator 110, a voltage-controlled oscillator 120, a ring oscillator 130, and a D flip-flop (DFF) 140. The noise-voltage generator 110 may be used to convert an external voltage VEXT into a noise voltage V1, and provide the noise voltage V1 to the voltage-controlled oscillator 120.

The voltage-controlled oscillator 120 may generate an irregular clock signal f1 according to the noise voltage V1. The ring oscillator 130 may be used for generating a sampling clock signal f2, wherein the sampling clock signal f2 is a regular clock signal.

In addition, the sampling clock signal f2 is provided to an clock-input terminal CLK of the DFF 140 to sample the clock signal f1 input into the data terminal D of the DFF 140 to generate an output digital signal fmix at the output terminal Q of the DFF 140, wherein the output digital signal fmix represents a random number.

The noise-voltage generator 110 may include a power-noise amplifier 112, a CTAT (complementary to absolute temperature) reference-voltage circuit 114, and an operational amplifier 116. The power-noise amplifier 112 may be used for amplify the power noise of the external voltage VEXT to generate a voltage VP, and the CTAT reference-voltage circuit 114 may generate a voltage VT through the ambient temperature, wherein the voltage VT is inversely proportional to the absolute temperature. The voltage VP passes through the capacitor C1 to be mixed with the voltage VT at node N1 to obtain a reference voltage VMIX.

The operational amplifier 116 can be used as a voltage regulator, wherein the reference voltage VMIX is input the positive input terminal of the operational amplifier 116, and the noise voltage V1 generated at the output terminal (node N2) of the operational amplifier 116 is input to the negative input terminal of the operational amplifier 116 through the feedback path formed by the resistors R2 and R3. For example, the relationship between the noise voltage V1 and the reference voltage VMIX is shown in equation (1): R3

$$\frac{R3}{R3 + R2} V1 = VMIX \qquad (1)$$

Accordingly, from equation (1), the noise $$V1 = \left(1 + \frac{R2}{R3}\right) VMIX$$

can be deduced.

Specifically, the feature of the ambient temperature is that the relative value changes slowly, so the voltage VT can determine the fundamental frequency of the clock signal f1. In addition, the feature of the power noise is that the instantaneous change is relatively fast, so the voltage VP will temporarily change the frequency of the clock signal f1.

The voltage-controlled oscillator 120 may use the noise voltage V1 to generate the irregular clock signal f1, and the frequency of the clock signal f1 may be affected by the external environment, such as the external voltage, ambient temperature, characteristics of the chip-manufacturing process, etc., but the thermal noise is not considered. The ring oscillator 130 may automatically generate the sampling clock signal f2, and the frequency of the sampling clock signal f2 is determined by the internal circuit of the ring oscillator 130. In addition, the voltage-controlled oscillator 120 and the ring oscillator 130 are controlled by the enable signal EN. when the enable signal EN is in the high-logic state, the voltage-controlled oscillator 120 and the ring oscillator 130 are in the working state to respectively generate the clock signal f1 and the sampling clock signal f2. When the enable signal EN is in the low-logic state, the voltage-controlled oscillator 120 and the ring oscillator 130 are turned off.

It should be noted that the present invention can utilize the design of the noise-voltage generator 110 to convert the power noise and the ambient temperature into the corresponding noise voltage V1, and the voltage-controlled oscillator 120 may generate the clock signal f1 (e.g., a digital signal) according to the noise voltage V1 (e.g., an analog signal). The aforementioned design does not require the use of an analog-to-digital converter (ADC) to convert thermal noise into digital signals.

Figure 2:
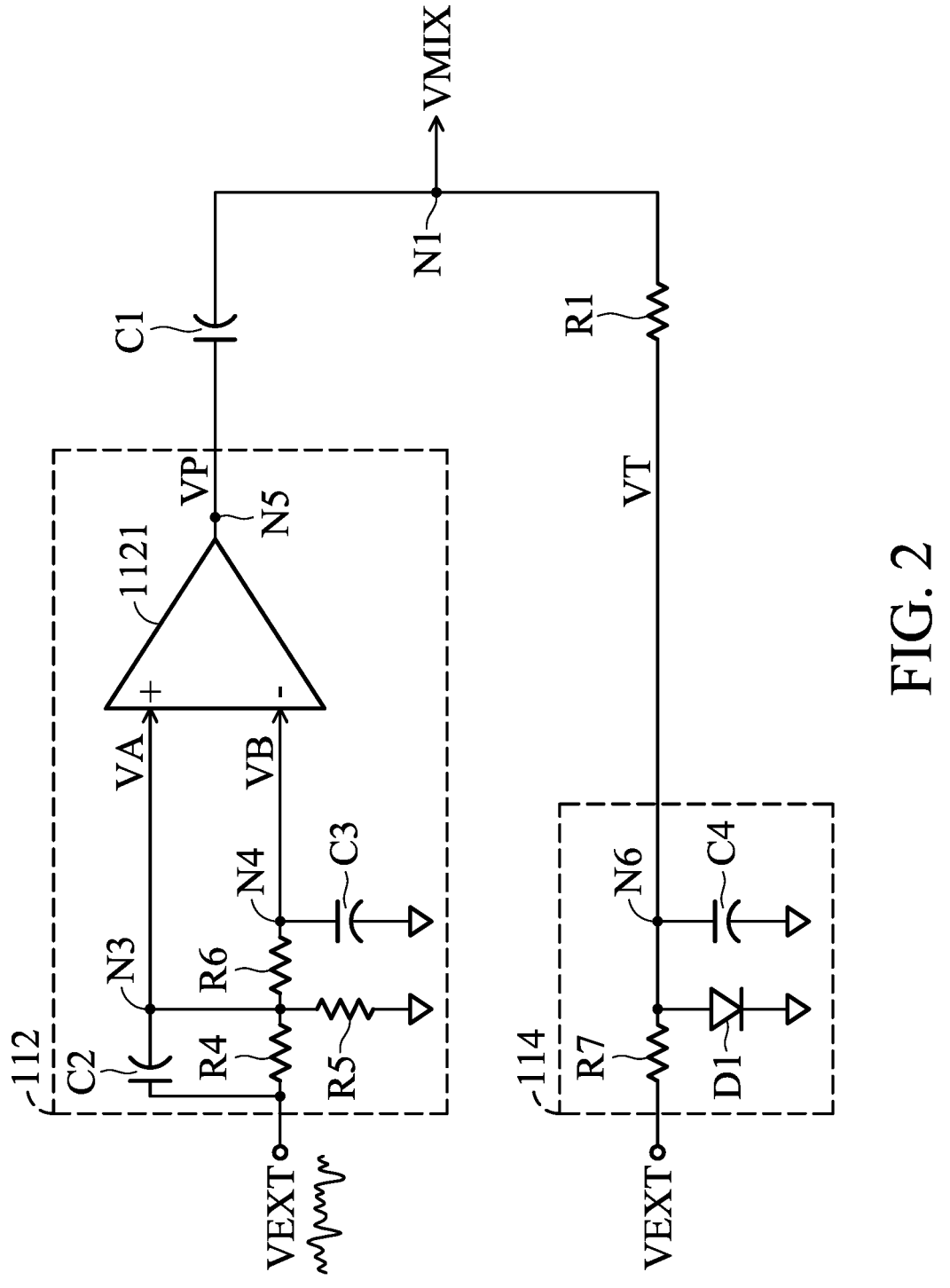
FIG. 2 is a schematic diagram of the power-noise amplifier and the CTAT reference-voltage circuit in accordance with an embodiment of the invention.

FIG. 2 is a schematic diagram of the power-noise amplifier and the CTAT reference-voltage circuit in accordance with an embodiment of the invention. Please refer to FIG. 1 and FIG. 2.

As shown in FIG. 2, in an embodiment, the first terminal and the second terminal of the capacitor C2 are respectively connected to the external voltage VEXT and node N3, and the first terminal and the second terminal of the resister R2 are respectively connected to the external voltage VEXT and node N3. Node N3 has a voltage VA, and the voltage VA is input to the positive input terminal (+) of the operational amplifier 1121. The voltage VA at node N3 passes through the RC circuit formed by the resistor R6 and the capacitor C3 to generate the voltage VB at node N4, and the voltage VB is input to the negative input terminal (−) of the operational amplifier 1121. Because the RC circuit formed by the resistor R6 and the capacitor C3 can be regarded as a low-pass filter, it can convert the voltage VA with a large variation of the power noise into the voltage VB with a smaller variation of the power noise. The difference between the voltages VA and VB is amplified by the operational amplifier 1121, the voltage VP can be obtained at the output terminal (node N5) of the operational amplifier 1121.

In an embodiment, the CTAT reference-voltage circuit 114, for example, may be implemented using the diode D1, capacitor C4, and resistor R7, wherein the diode D1 can also be implemented by a bipolar transistor (BJT) or a field-effect transistor (FET) with diode connection. For example, the collector and base of the NPN BJT can be connected to node N6 at the same time, and the emitter of the NPN BJT is grounded, which can be equivalently treated as the diode D1.

Figure 3A:
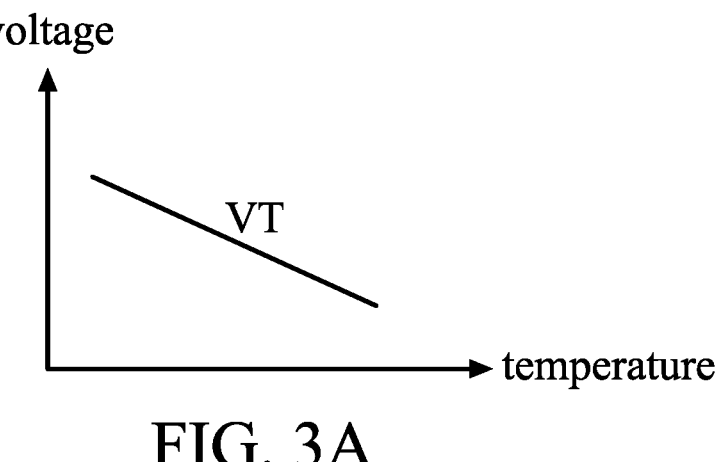
FIG. 3A is a diagram showing the relationship between the voltage VT and temperature in accordance with an embodiment of the invention.

If an N-type MOSFET is used, the gate and drain of the MOSFET can be connected to node N6 at the same time, and the source of the MOSFET is grounded, which can be equivalently treated as the diode D1. Accordingly, the CTAT reference-voltage circuit 114 can obtain the voltage VT with a negative temperature coefficient at node N6. That is, when the ambient temperature (i.e., absolute temperature) is higher, the voltage VT is lower. When the ambient temperature is lower, the voltage VT is higher, wherein the aforementioned relationship between the ambient temperature and the voltage VT is shown in FIG. 3A.

Figure 3B:
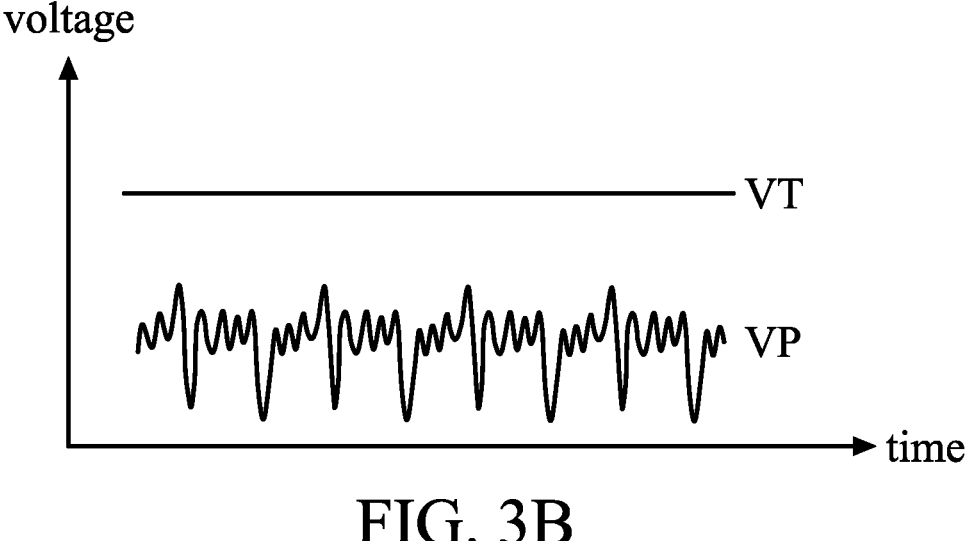
FIG. 3B is a diagram showing the voltages VT and VP in accordance with an embodiment of the invention.
Figure 3C:
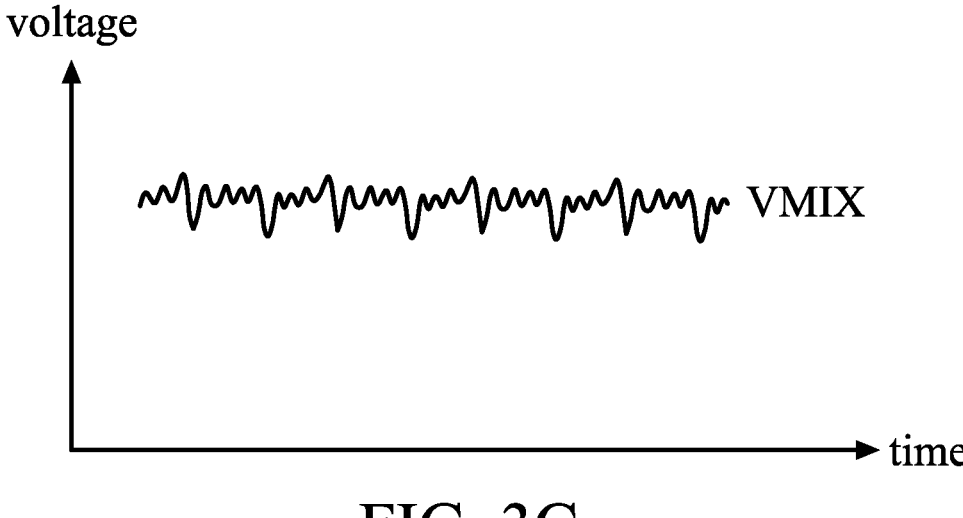
FIG. 3C is a diagram showing the reference VMIX in accordance with an embodiment of the invention.

Specifically, after the voltage VT passes through the resistor R1, the direct-current (DC) level of the reference voltage VMIX can be generated at node N1. After the voltage VP is disturbed by the capacitor C1, the transient level of the reference voltage VMIX can be obtained at node N1. As shown in FIG. 3B, the noise variation of the voltage VP is relatively high, which can be regarded as the transient level of the reference voltage VMIX. Although the voltage VT changes with the ambient temperature, because the ambient temperature changes slowly, the voltage VT can be roughly maintained at a constant value. Therefore, the reference voltage VMIX can be regarded as superimposing the aforementioned transient level on the aforementioned DC level, as shown in FIG. 3C. It should be noted that the random-number-generating circuit 100 in the present invention may use power noise and temperature as noise sources instead of thermal noises.

In addition, the noise-voltage generator 110 in the random-number-generating circuit 100 uses the diode, resistors, and capacitors to generate the noise source, and does not require complicated analog-to-digital converters or temperature sensors, so it has a lower area cost when implemented in an integrated circuit.

Figure 4:
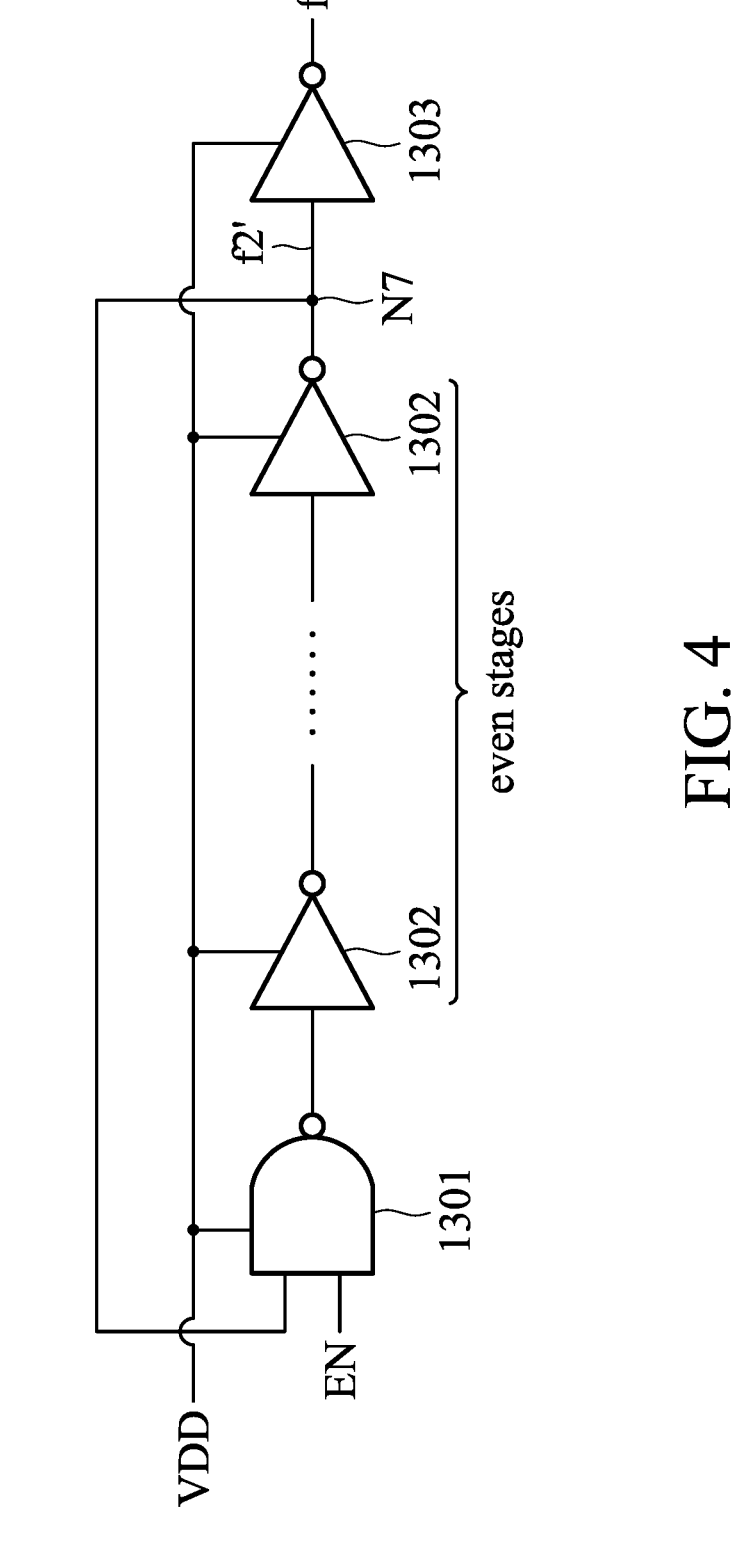
FIG. 4 is a diagram of the ring oscillator in accordance with an embodiment of the invention.

FIG. 4 is a diagram of the ring oscillator in accordance with an embodiment of the invention.

In an embodiment, the ring oscillator 130, for example, may be implemented using a NAND gate 1301 and a plurality of inverters 1302 and 1303. The power-supply voltage VDD is provided to the NAND gate 1301 and the inverters 1302-1303 for operation, wherein the power-supply voltage VDD may be the external voltage VEXT. The first input terminal of the NAND gate 1301 may receive the enable signal EN, and the second input terminal of the NAND gate 1302 may receive the clock signal f2' generated at the output of the inverter 1302 at the last stage.

For example, when the enable signal EN is in the low-logic state, the output terminal of the NAND gate 1301 is continuously in the high-logic state, so the ring oscillator 130 cannot oscillate at this time. When the enable signal EN is in the high-logic state, the output signal of the NAND gate 1301 is the inverted signal of the input signal in its second input terminal, so the NAND gate 1301 can be regarded as an inverter at this time. Accordingly, the NAND gate 1301 plus even-numbered stages of inverters 1302 can be collectively regarded as odd-numbered stages of inverters connected in series, so the oscillation can continue and the clock signal f2' can be obtained at the output terminal of the inverter 1302 at the last stage. For example, there are 2N inverters 1302, where N is a positive integer.

After the clock signal f2' passes through the inverter 1302, the sampling clock signal f2 can be obtained. One having ordinary skill in the art can understand that the oscillation frequency of the ring oscillator 130 (i.e., the frequency of the sampling clock signal f2) can be changed by adjusting the number of stages of the inverters 1302 and the size of the transistors, and the details will be omitted here.

5

Figure 5:
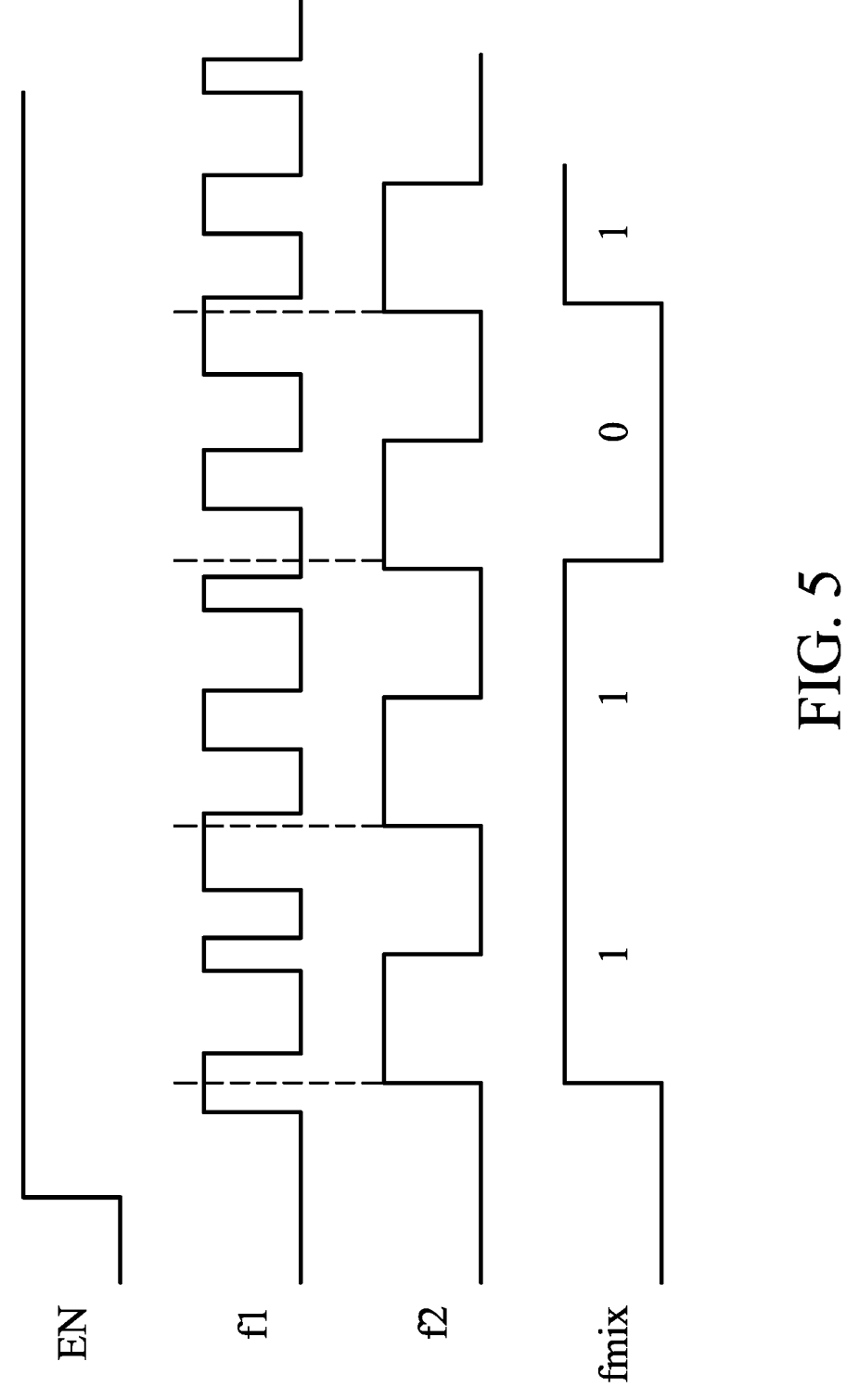
FIG. 5 is a waveform diagram of the sampling operations of the D flip-flop in accordance with the embodiment of FIG. 1.

FIG. 5 is a waveform diagram of the sampling operations of the D flip-flop in accordance with the embodiment of FIG. 1. Please refer to FIG. 1 and FIG. 5.

As shown in FIG. 5, when the enable signal EN is in the high-logic state, the voltage-controlled oscillator 120 and the ring oscillator 130 start to oscillate to respectively generate the clock signal f1 and the sampling clock signal f2, wherein the clock signal f1 is an irregular clock signal, and the sampling clock signal f2 is a regular clock signal. The sampling clock signal f2 is provided to the clock input terminal CLK of the DFF 140 to sample the clock signal f1 input to the data terminal of the DFF 140, and generate an output digital signal fmix at the output terminal Q of the DFF 140.

Specifically, the DFF 140 samples the clock signal f1 at the rising edge of the sampling clock signal f2. Because the clock signal f1 is an irregular clock signal, whenever the sampling clock signal f2 is at the positive edge, the output digital signal fmix obtained by the DFF 140 at its output terminal Q also includes irregular values 0 or 1. In other words, the output digital signal fmix is a random number.

In view of the above, a random-number-generating circuit is provided, which is capable of using the power noise and temperature as the noise source instead of the thermal noise. In addition, the random-number-generating circuit in the present invention can use the diode, resistors, and capacitors to generate the noise source, and does not require complicated analog-to-digital converters or temperature sensors, so it has a lower area cost when implemented in an integrated circuit. Besides, the random number generated by the random-number-generating circuit in the present invention is affected by the power noise, temperature, and manufacturing process, so it is not easy to appear regular, and its effect is close to the real random number.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A random-number-generating circuit, comprising:
a noise-voltage generator, converting an external voltage into a noise voltage;
a voltage-controlled oscillator, receiving the noise voltage, and generating a first clock signal according to the noise voltage;
a ring oscillator, generating a sampling clock signal; and
a D flip-flop (DFF), receiving the first clock signal, and sampling the first clock signal using the sampling clock signal to obtain an output digital signal, wherein the output digital signal represents a random number,
wherein the noise-voltage generator comprises:
a power-noise amplifier, amplifying power noise of the external voltage to generate a first voltage;
a CTAT (complementary to absolute temperature) reference-voltage circuit, generating a second voltage using ambient temperature of the random-number-generating circuit; and
a first operational amplifier.
2. The random-number-generating circuit as claimed in claim 1, wherein the first voltage is provided to a positive input terminal of the first operational amplifier through a first capacitor, and the second voltage is provided to the positive input terminal of the first operational amplifier through a first resistor.

3. The random-number-generating circuit as claimed in claim 2, wherein the noise voltage is input to a negative input terminal of the first operational amplifier through a feedback path.

4. The random-number-generating circuit as claimed in claim 1, wherein the second voltage has a negative temperature coefficient.

5. The random-number-generating circuit as claimed in claim 1, wherein the first voltage represents a transient level of a reference voltage, and the second voltage represents a direct-current (DC) level of the reference voltage.

6. The random-number-generating circuit as claimed in claim 1, wherein the second voltage determines a fundamental frequency of the first clock signal, and the first voltage temporarily changes a frequency of the first clock signal.

7. The random-number-generating circuit as claimed in claim 1, wherein the feedback path comprises a second resistor and a third resistor, and a first terminal and a second terminal of the second resistor are respectively connected to a second node and the negative input terminal of the first operational amplifier, and a first terminal and a second terminal of the third resistor are respectively connected to the negative input terminal of the first operational amplifier and the ground,
wherein the second node is an output terminal of the first operational amplifier.

8. The random-number-generating circuit as claimed in claim 1, wherein the power-noise amplifier comprises a second operational amplifier, and the external voltage is connected to a third node through a second capacitor and a fourth resistor in parallel, and the third node is connected to a positive input terminal of the second operational amplifier,
wherein a first terminal and a second terminal of a fifth resistor are respectively connected to the third node and the ground, and the third node is connected to a negative input terminal of the second operational amplifier through a low-pass filter formed by a sixth resistor and a third capacitor.

9. The random-number-generating circuit as claimed in claim 1, wherein the CTAT reference-voltage circuit comprises a seventh resistor, a diode, and a fourth capacitor, wherein a first terminal and a second terminal of the seventh resistor are respectively connected to the external voltage and a sixth node,
wherein an anode and a cathode of the diode are respectively connected to the sixth node and the ground, and a first terminal and a second terminal of the fourth capacitor are respectively connected to the sixth node and the ground,
wherein the sixth node is an output terminal of the CTAT reference-voltage circuit.

10. The random-number-generating circuit as claimed in claim 1, wherein the voltage-controlled oscillator and the ring oscillator are controlled by an enable signal, and when the enable signal is in a high-logic state, the voltage-controlled oscillator and the ring oscillator are in a working state to respectively generate the first clock signal and the sampling clock signal,
wherein when the enable signal is in a low-logic state, the voltage-controlled oscillator and the ring oscillator are turned off.

11. The random-number-generating circuit as claimed in claim 10, wherein the ring oscillator comprises a NAND gate, a plurality of first inverters, and a second inverter that are connected in series.

12. The random-number-generating circuit as claimed in claim 11, wherein both the enable signal and a second clock signal generated by the last inverter among the first inverters are input to the NAND gate, and there are 2N first inverters, where N is a positive integer.

13. The random-number-generating circuit as claimed in claim 12, wherein the second clock signal is input to the second inverter to obtain the sampling clock signal.

14. The random-number-generating circuit as claimed in claim 1, wherein the first clock signal is an irregular clock signal, and the sampling clock signal is a regular clock signal.

15. The random-number-generating circuit as claimed in claim 1, wherein the DFF samples the first clock signal at each rising edge of the sampling clock signal to obtain the output digital signal.

* * * * *